United States Patent [19]

Watt

[11] 4,098,261
[45] Jul. 4, 1978

[54] FLAT PLATE SOLAR COLLECTOR PANEL HAVING EXTRUDED THERMAL CONDUCTORS

[76] Inventor: Richard Edwin Watt, 6384 Rockhurst Dr., San Diego, Calif. 92120

[21] Appl. No.: 771,198

[22] Filed: Feb. 23, 1977

[51] Int. Cl.² .............................................. F24J 3/02
[52] U.S. Cl. ..................................... 126/271; 165/171
[58] Field of Search ............... 126/270, 271; 237/1 A; 165/168, 169, 170, 171, 172

[56] References Cited

U.S. PATENT DOCUMENTS

| | | | |
|---|---|---|---|
| 2,625,378 | 1/1953 | Nason | 165/171 |
| 4,026,272 | 5/1977 | Bottum | 126/271 |
| 4,027,652 | 6/1977 | Collura | 126/271 |

FOREIGN PATENT DOCUMENTS

| | | | |
|---|---|---|---|
| 2,336,247 | 2/1975 | Fed. Rep. of Germany | 126/270 |

Primary Examiner—Kenneth W. Sprague
Assistant Examiner—James C. Yeung
Attorney, Agent, or Firm—Brown & Martin

[57] ABSTRACT

A solar collector panel wherein heat absorbed in a collector plate having a broad, uniformly flat surface area may be conducted by a plurality of thermal conductors to a fluid flowing through pipes that are arrayed over the flat surface area of the collector plate. Each of the thermal conductors has broad flat surfaces in contact with the flat surface of the collector plate on opposite sides of the pipe, and an inner surface in mating contact with most of the pipe. The thickness of the thermal conductor increases from the extreme ends of its broad flat surfaces toward its inner surface. The thermal conductors are aluminum extrusions. A thermal joint compound is applied between the thermal conductors and the contacted surfaces of the pipes and the collector plate.

5 Claims, 3 Drawing Figures

FLAT PLATE SOLAR COLLECTOR PANEL HAVING EXTRUDED THERMAL CONDUCTORS

BACKGROUND OF THE INVENTION

The present invention generally pertains to solar energy collection and is particularly directed toward improving solar collector panel design by increasing the thermal efficiency of the panel.

A typical solar collector panel includes a collector plate for absorbing radiant heat; and a plurality of pipes in an array fastened to the surface of the collector plate for transporting a fluid for conducting heat energy from the solar collector plate.

In the design of solar collector panels used for swimming pool heating, space heating, and other heating and cooling applications, it is desirable that optimum efficiency be attained so as to reduce the initial cost of installation by reducing the panel area required for a given installation. The thermal efficiency of a solar collector panel depends primarily upon its capacity for transferring heat absorbed by the collector plate into the fluid through direct heat conduction.

Most solar collector panels presently being manufactured are not optimally efficient in conducting heat from the collector plate to the fluid. Typically the sheet stock for the collector plate is shaped to form semicircular channels into which the pipes are fitted. Because of the forming requirement, the sheet stock that is used is usually too thin to provide good lateral heat transfer from all parts of the collector plate to the pipes, thereby greatly reducing the operating efficiency. Also, machine forming of semicircular channels usually cannot be accomplished to the accuracy required for the close mating contact with the pipes required for efficient heat conduction.

The importance of achieving optimum thermal conductivity in a solar collector panel can be understood by examining the general equation for solar collector efficiency, which is:

$$\eta = F_R \left[ \overline{\alpha\tau} - U_L \frac{(T_i - T_a)}{q^i} \right]$$

Where:
N = efficiency
$F_R$ = collector plate heat-removal efficiency factor
$\overline{\alpha\tau}$ = the averaged product of the collector plates' solar absorptance and the transmittance of the glazing cover
$U_L$ = collector overall heat-loss factor
$T_i$ = inlet water temperature
$T_a$ = ambient collector temperature
$q_i$ = received solar radiation The three most important considerations in collector panel design involve the factors of $F_R$, $\overline{\alpha\tau}$ and $U_L$. The parameter $\overline{\alpha\tau}$ is affected by the choice of the glazing material and collector plate absorber surface. Insulation properties of the collector panel govern the $U_L$ factor. The most neglected design factor in many of the current solar panels being marketed is that of $F_R$.

The collector plate heat-removal efficiency factor $F_R$, in effect, represents the thermal conductivity of the panels' heat-gathering apparatus. Efficient absorber surfaces, glazing materials and insulating materials are readily available and are employed in most collector designs. However, the heat-removal efficiency factor ($F_R$) is not as a rule given prime consideration. The object of this invention is to maximize collector thermal conductivity (the $F_R$ factor) and thereby increase thermal efficiency.

SUMMARY OF THE INVENTION

The present invention provides a more thermally efficient solar collector panel of the type including a collector plate for absorbing radiant heat; and a plurality of pipes in an array over a surface of the collector plate for transporting a fluid for conducting heat energy from the solar panel. The solar collector panel of the present invention is characterized by the collector plate having a broad uniformly flat surface area over which the pipes are arrayed; and by a plurality of thermal conductors for conducting heat energy from the collector plate to the pipes, wherein each of the thermal conductors has broad flat surfaces in contact with the flat surface of the collector plate on opposite sides of the pipe, and an inner surface in mating contact with most of the pipe; with the thickness of the thermal conductor increasing from the extreme ends of its broad flat surfaces toward its inner surface. The thermal conductors are extrusions. An extrusion readily provides the accuracy of fit to the pipe required for efficient thermal conduction.

Because the pipes and thermal conductors are arrayed over a flat surface area of the collector plate and no channel forming is required, the plate may be thicker, thereby providing greater lateral heat transfer. A flat collector plate of uniform thickness is preferred because of the lower cost of manufacture, as contrasted with collector plates containing formed channels.

The thermal conductors are shaped to provide a low thermal resistance path from the collector plate to the pipes. This low thermal resistance path is provided by the broad flat surfaces of the thermal conductors that are in contact with the flat surface of the collector sheet, and by the increasing cross sectional area of the thermal conductors as the conduction path extends from the plate toward the pipe.

The thermal efficiency of the solar collector panel of the present invention is further enhanced by the use of a thermal joint compound between the thermal conductors and the contacted surfaces of the pipes and the collector plate for filling voids between the thermal conductors and said contacted surfaces.

The primary advantages of the solar collector panel of the present invention are that it provides improved thermal efficiency, thereby decreasing the overall size of a solar collector panel installation for providing a given quantity of heat; and that it can be manufactured relatively inexpensively.

DESCRIPTION OF THE PREFERRED EMBODIMENT

Figure 1:
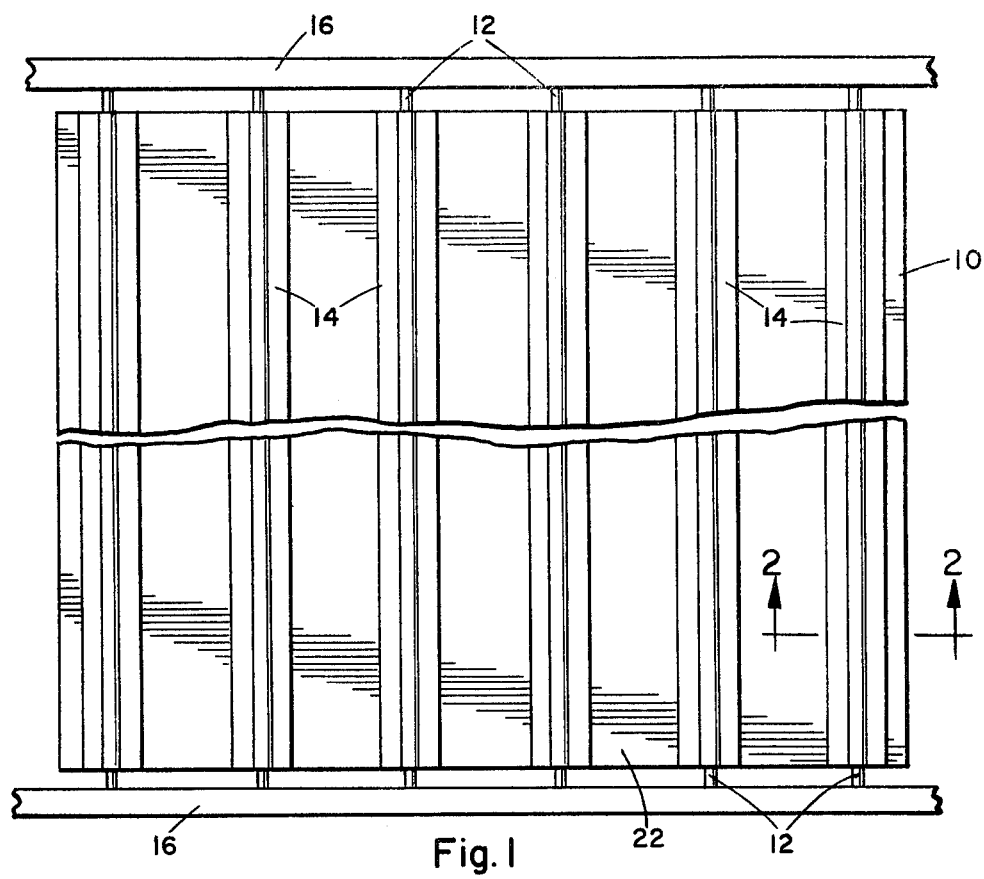
FIG. 1 is a plan view of a solar collector panel in accordance with the present invention.

Referring to FIG. 1, a preferred embodiment of a solar collector panel according to the present invention includes a flat collector plate 10 for absorbing radiant heat, a plurality of pipes 12, and a plurality of thermal conductors 14. The pipes 12 are connected to header pipes 16 (manifolds).

Figure 2:
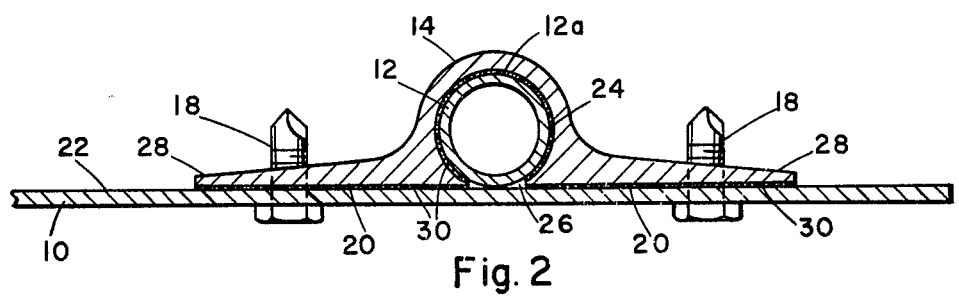
FIG. 2 is an enlarged sectional view taken on line 2—2 of FIG. 2.

The assembly of a thermal conductor 14 with a pipe 12 and flat collector plate 10 is shown in FIG. 2. To facilitate a permanent assembly, drill screws 18 (or rivets) are used to join the thermal conductor 14 to the collector plate 10.

Figure 3:
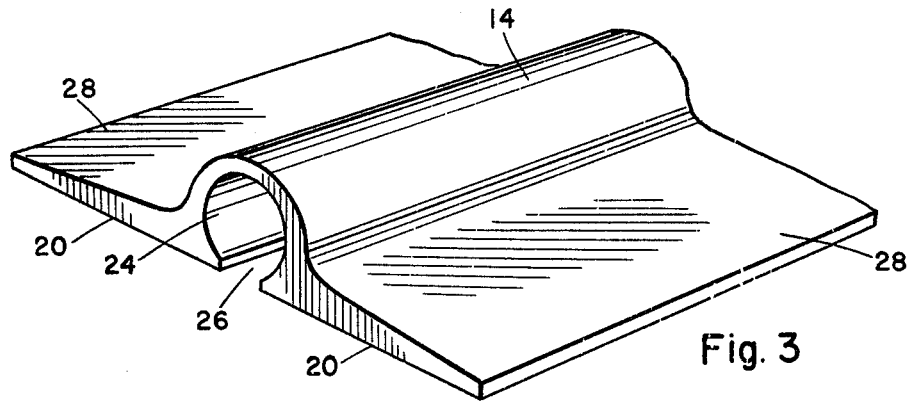
FIG. 3 is a perspective view of a portion of a thermal conductor.

With reference to both FIGS. 2 and 3, the thermal conductors 14 each have broad flat surfaces 20 in contact with the flat surface 22 of the flat collector plate 10 on opposite sides of the pipe 12. The thermal conductors 14 also have an inner surface 24 in mating contact with most of the pipe 12. The thermal conductor 14 contacts the pipe 12 for the full length of the pipe 12 and for all of the circumference of the pipe 12 except for a very small opening 26 between the adjacent ends of the flat surfaces 20 of the thermal conductor 14.

It is seen that the thickness of the thermal conductor 14 increases from the extreme ends 28 of its broad flat surfaces 20 toward its inner surface 24.

The thermal conductors 14 are aluminum alloy extrusions; and the pipes 12 are copper tubing.

A thermal joint compound 30 is applied between the surfaces 20 and 24 of the thermal conductors 14 and the contacted surfaces 22, 12a of the collector plate 10 and the pipe 12, respectively, for filling voids between the thermal conductors 14 and said contacted surfaces 22, 12a. The thermal joint compound is a silicon compound having a thermal conductivity in the range of about 5 to 20 BTU-IN/HR-FT$^2$-° F. A preferred thermal joint compound is Wakefield type 120 or its equivalent having a thermal conductivity of about 7.4. By way of contrast the thermal conductivity of air is 0.192. Therefore the thermal efficiency is appreciably increased by filling the air voids with the thermal joint compound 30.

The flat collector plate 10 is of uniform thickness. The pipes 12 are arrayed over a broad flat surface area of the collector plate 10. The distances between the thermal conductors 14 on the collector plate 10 is governed by the thickness of the plate 10. Lateral transfer of heat increases as the thickness of the plate 10 increases. Thus fewer thermal conductors 14 and pipes 12 are required when the plate 10 thickness is increased.

Having described my invention, I now claim:

1. A solar collector panel wherein heat absorbed in a collector plate may be conducted to a fluid flowing through pipes that are arrayed over the surface of the plate, comprising
    a collector plate for absorbing radiant heat; and
    a plurality of pipes in an array over a surface of the collector plate for transporting a fluid for conducting heat energy from the solar collector panel;
    wherein the collector plate has a broad uniformly flat surface area over which the pipes are arrayed;
    characterized by
    a plurality of thermal conductors for conducting heat energy from the collector plate to the pipes, wherein each of the thermal conductors has broad flat surfaces in contact with the flat surface of the flat collector plate on opposite sides of the pipe, and an inner surface in mating contact with most of the pipe; with the thickness of the thermal conductor increasing from the extreme ends of its broad flat surface toward its inner surface, wherein the thermal conductors are extrusions.

2. A solar panel according to claim 1, wherein the extrusions comprise an aluminum alloy.

3. A solar collector panel according to claim 1, wherein the collector plate is of uniform thickness.

4. A solar collector panel according to claim 1, wherein the collector plate is of uniform thickness.

5. A solar collector panel according to claim 1, further comprising,
    a thermal joint compound between the thermal conductors and the contacted surfaces of the pipes and the collector plate for filling voids between the thermal conductors and said contacted surfaces.

* * * * *